US011713229B2

United States Patent
Kobayashi et al.

(10) Patent No.: US 11,713,229 B2
(45) Date of Patent: Aug. 1, 2023

(54) MOWER (71) Applicant: Kubota Corporation, Osaka (JP)

(72) Inventors: Terumasa Kobayashi, Sakai (JP); Nobuyuki Yamashita, Sakai (JP); Ryotaro Nakatsu, Sakai (JP)

(73) Assignee: Kubota Corporation, Osaka (JP)

( * ) Notice: Subject to any disclaimer, the term of this patent is extended or adjusted under 35 U.S.C. 154(b) by 537 days.

(21) Appl. No.: 16/897,560

(22) Filed: Jun. 10, 2020

(65) Prior Publication Data
US 2021/0139301 A1 May 13, 2021

(30) Foreign Application Priority Data
Nov. 12, 2019 (JP) ................. 2019-204874

(51) Int. Cl.
B66F 7/24 (2006.01)
A01D 34/00 (2006.01)
A01D 34/81 (2006.01)
A01D 34/66 (2006.01)
A01D 101/00 (2006.01)

(52) U.S. Cl.
CPC ............ B66F 7/243 (2013.01); A01D 34/001 (2013.01); A01D 34/81 (2013.01); A01D 34/661 (2013.01); A01D 2101/00 (2013.01)

(58) Field of Classification Search
CPC ...... A01D 34/001; A01D 34/64; A01D 34/81; A01D 34/661; A01D 67/005; B66F 7/243
See application file for complete search history.

(56) References Cited

U.S. PATENT DOCUMENTS

| 7,685,800 | B2 * | 3/2010 | Sugio | A01D 34/64 56/320.1 |
| 9,699,962 | B2 * | 7/2017 | Akita | A01D 34/81 |
| 11,178,816 | B2 * | 11/2021 | Anderson | A01D 34/81 |
| 2007/0028577 | A1 * | 2/2007 | Clement | A01D 34/64 56/17.2 |
| 2008/0236125 | A1 * | 10/2008 | Sugio | A01D 34/81 56/14.7 |
| 2016/0183454 | A1 * | 6/2016 | Akita | A01D 34/81 56/320.1 |
| 2020/0267898 | A1 * | 8/2020 | Anderson | B66F 7/243 |

FOREIGN PATENT DOCUMENTS

| JP | 2008289429 A | 12/2008 |
| JP | 2015126705 A | 7/2015 |
| JP | 2016123315 A | 7/2016 |
| JP | 5973402 B2 * | 8/2016 |
| JP | 6162600 B | 7/2017 |

* cited by examiner

Primary Examiner — Abigail A Risic
(74) Attorney, Agent, or Firm — The Webb Law Firm (57) ABSTRACT There are included front and back slope portions attachable to and detachable from storage positions and use positions, front and back holding portions capable of engaging with engagement portions of the front and back slope portions as attached to the storage positions and holding the front and back slope portions at the storage positions, and a disengaging operation tool capable of being manually operated to a disengaging position at which the front holding portion and the back holding portion are releasable from the engagement portions of the front and back slope portions and at which the slope portions are detachable from the storage positions.

13 Claims, 8 Drawing Sheets

MOWER

CROSS-REFERENCE TO RELATED APPLICATION

This application claims priority to Japanese Patent Application No. 2019-204874 filed Nov. 12, 2019, the disclosure of which is hereby incorporated by reference in its entirety.

TECHNICAL FIELD

The present invention relates to a mid-mount mower supported on a portion of a work vehicle such as a tractor which portion is between front wheels and the rear wheels.

BACKGROUND ART

In the case where a mid-mount mower is to be attached to a work vehicle, an operator moves the work vehicle forwardly, for example, over the mower on the ground so that the front wheels of the work vehicle move over the mower from the back side of the mower deck to its front side. This allows the mower on the ground to be positioned between the front wheels and the rear wheels of the work vehicle, and allows the mower to be attached to the work vehicle.

In the case where a mower attached to a work vehicle is to be detached therefrom, an operator detaches the mower from the work vehicle, places the mower on the ground, and moves the work vehicle forwardly, for example, so that the rear wheels of the work vehicle move over the mower from the back side of the mower deck to its front side.

In this case, as disclosed in Patent Literature 1, a mower includes a passage portion provided at each of a right portion and a left portion of an upper surface portion of a mower deck and oriented in the front-back direction. Further, at a front portion and a back portion of each passage portion, front and back slope portions are provided.

With this configuration, wheels of a work vehicle pass from the back slope portion to the passage portion and to the front slope portion or in a reverse manner from the front slope portion to the passage portion and to the back slope portion, so that the wheels of the work vehicle can move over the mower deck with ease.

CITATION LIST

Patent Literature

Patent Literature 1: Japanese Patent No. 6162600

SUMMARY OF INVENTION

Technical Problem

Patent Literature 1 discloses that the passage portion has an elongate hole which is open in the front-back direction, that a pin provided at each slope portion is inserted in the elongate hole of the passage portion, and that the slope portion is supported by the passage portion in such a manner as to be moveable in the front-back direction and swingable in the up-down direction. With this configuration, the slope is operated to a storage position provided at the passage portion and to a use position at which the slope extends from a front portion (back portion) of the passage portion obliquely in a lower front direction (lower back direction) to be in contact with the ground.

In contrast to the above-described configuration, there has been proposed a configuration in which a slope portion is placed at a storage position or use position by attachment and detachment as follows: An operator detaches a slope portion from a storage position at a passage portion and attaches the slope portion to a use position, and detaches the slope portion from the use position and attaches the slope portion to the storage position.

It is an object of the present invention to, for a mower including a passage portion and a slope portion and configured such that the slope portion is placed at a storage position or use position by attachment and detachment, improve operability in attaching and detaching the slope portion.

Solution to Problem

A mower of one or more embodiments of the present invention comprises: a passage portion provided at each of a right portion and a left portion of an upper surface portion of a mower deck and oriented in a front-back direction on which passage portion a wheel of a work vehicle passes; a front slope portion attachable to and detachable from a front storage position provided at the passage portion and a front use position at which the front slope portion extends from a front portion of the passage portion obliquely in a lower front direction such that a front portion of the front slope portion is in contact with ground; a back slope portion attachable to and detachable from a back storage position provided at the passage portion and a back use position at which the back slope portion extends from a back portion of the passage portion obliquely in a lower back direction such that a back portion of the back slope portion is in contact with the ground; a front holding portion configured to engage with an engagement portion of the front slope portion as attached to the front storage position and hold the front slope portion at the front storage position; a back holding portion configured to engage with an engagement portion of the back slope portion as attached to the back storage position and hold the back slope portion at the back storage position; and a disengaging operation tool configured to be manually operated to a disengaging position at which the front holding portion is releasable from the engagement portion of the front slope portion such that the front slope portion is detachable from the front storage position and at which the back holding portion is releasable from the engagement portion of the back slope portion such that the back slope portion is detachable from the back storage position.

With the present invention, in the case where a slope portion has been attached to a storage position, a holding portion engages with an engagement portion of the slope portion, so that the slope portion is held at the storage position. Thus, there is a low possibility that the slope portion becomes detached from the storage position due to vibration or the like during operation.

In the case where an operator detaches the front and back slope portions in a state where the front and back slope portions are held at the front and back storage positions, the operator can operate both the front and back holding portions to a disengaging position by operating the disengaging operation tool. The operator does not need to separately operate the front holding portion to a disengaging position and operate the back holding portion to a disengaging position.

This allows the operator to detach the front and back slope portions from the storage positions and attach the front and back slope portions to the use positions. The above configuration thus improves operability in detaching the front and back slope portions from the front and back storage positions.

The present invention may preferably be arranged such that the front holding portion engages with the engagement portion of the front slope portion in an engaging direction identical to a direction in which the back holding portion engages with the engagement portion of the back slope portion, and the front holding portion disengages from the engagement portion of the front slope portion in a disengaging direction identical to a direction in which the back holding portion disengages from the engagement portion of the back slope portion, the disengaging direction being opposite to the engaging direction.

With the present invention, both the front and back holding portions may be operated with use of the disengaging operation tool in the same disengaging direction. Thus, it is easy to provide a configuration in which both the front and back holding portions are operated to the disengaging position with use of the disengaging operation tool. There is an advantage in terms of structural simplification.

The present invention may preferably be arranged such that the front holding portion, the back holding portion, and the disengaging operation tool are provided on a single operating member, and the operating member is supported in such a manner as to be movable in the engaging direction and the disengaging direction.

With the present invention, the front and back holding portions and the disengaging operation tool are provided on a single operating member. Thus, it is easy to provide a configuration in which both the front and back holding portions are operated in the same disengaging direction with use of the disengaging operation tool. There is an advantage in terms of structural simplification.

The present invention may preferably be arranged such that a first one of the engaging direction and the disengaging direction is a forward direction along the passage portion, and a second one of the engaging direction and the disengaging direction is a backward direction along the passage portion.

With the present invention, the operating member is supported in such a manner as to be movable in the front-back direction along the passage portion, and both the front and back holding portions are operated to the disengaging position by operating the operating member in the forward direction or backward direction with use of the disengaging operation tool.

This allows the structure supporting the operating member to be compact along the passage portion and the region of operation of the disengaging operation tool to be compact along the passage portion.

The present invention may preferably further comprise: an urging member urging the operating member in the engaging direction, wherein when the front slope portion is to be attached to the front storage position, the front holding portion engages automatically with the engagement portion of the front slope portion, and when the back slope portion is to be attached to the back storage position, the back holding portion engages automatically with the engagement portion of the back slope portion.

With the present invention, when an operator has attached the front slope portion to the front storage position, the front holding portion engages automatically with the engagement portion of the front slope portion, so that the front slope portion is held at the front storage position. When an operator has attached the back slope portion to the back storage position, the back holding portion engages automatically with the engagement portion of the back slope portion, so that the back slope portion is held at the back storage position. This improves operability in attaching a slope portion to a storage position.

With the present invention, an urging member for causing the front and back holding portions to engage with the engagement portions of the front and back slope portions is attached to the operating member, and the front and back holding portions are urged in the engaging direction by the same urging member attached to the operating member.

This eliminates the need to separately provide an urging member for causing the front holding portion to engage with the engagement portion of the front slope portion and an urging member for causing the back holding portion to engage with the engagement portion of the back slope portion. Thus, there is an advantage in terms of structural simplification.

The present invention may preferably be arranged such that the passage portion includes a right side plate and a left side plate that are oriented in the front-back direction, a space between the right side plate and the left side plate is open in an upward direction, the front storage position and the back storage position are provided between the right side plate and the left side plate in a plan view, and the front slope portion and the back slope portion are placed between the right side plate and the left side plate from above the right side plate and the left side plate so that the front slope portion and the back slope portion become attached to the front storage position and the back storage position, respectively.

With the present invention, an operator can attach a slope portion to and detach a slope portion from a storage position from above the mower (passage portion). This improves operability in handling the slope portions.

With the present invention, the slope portions are positioned between the right and left side plates in a plan view in a state where the slope portions are attached to the storage positions. Thus, there is an advantage in terms of making the passage portion (right and left side plates) and the slope portions compact.

In the case where a mower is to be attached to a work vehicle or the case where a mower attached to a work vehicle is to be detached therefrom, wheels of the work vehicle move on and past a passage portion, so the passage portion needs to be so strong as to support the weight of the work vehicle.

With the present invention, right and left side plates oriented in the front-back direction are provided at the passage portion. Thus, there is an advantage in terms of ensuring strength of the passage portion.

The present invention may preferably be arranged such that the front holding portion and the back holding portion are positioned between the right side plate and the left side plate in the plan view and below the front slope portion and the back slope portion as attached to the front storage position and the back storage position, respectively.

With the present invention, the holding portions are positioned between the right and left side plates in a plan view in a state where the slope portions are attached to the storage positions. Thus, there is an advantage in terms of making the passage portion (right and left side plates) and the holding portions compact.

In this case, the holding portions are positioned below the slope portions, so that the holding portions are in a state where the holding portions are covered by the slope portions. Thus, there is an advantage in terms of making the passage portion (right and left side plates) and the holding portions compact.

The present invention may preferably further comprise: a front guiding portion configured to guide the engagement portion of the front slope portion to the front holding portion when the front slope portion is to be attached to the front storage position; and a back guiding portion configured to guide the engagement portion of the back slope portion to the back holding portion when the back slope portion is to be attached to the back storage position.

With the present invention, when an operator attaches a slope portion to a storage position, the engagement portion of the slope portion is guided by a guiding portion to a holding portion. This improves operability in attaching a slope portion to a storage position, and further ensures that the slope portion is held at the storage position.

The present invention may preferably be arranged such that the front guiding portion is provided on either of the right side plate and the left side plate, and the back guiding portion is provided on either of the right side plate and the left side plate.

When an operator attaches a slope portion to a storage position, a holding portion may not engage appropriately with an engagement portion of the slope portion if the slope portion is oriented oppositely to the normal orientation relative to the storage position.

With the present invention, each guiding portion is provided on either of the right and left side plates. Thus, when an operator attaches a slope portion to a storage position, if the slope portion is not oriented normally, the guiding portion is in a state where the guiding portion does not act on the slope portion, and the guiding portion resists the attachment, making it difficult to attach the slope portion to the storage position.

The operator can, since the attachment of a slope portion to a storage position is made difficult, recognize that the slope portion is not oriented normally, and can orient the slope portion normally and attach the slope portion to the storage position.

The present invention may preferably be arranged such that the front holding portion, the back holding portion, and the disengaging operation tool are provided on the passage portion, and the mower further comprises an attaching portion configured to attach the passage portion to and detach the passage portion from the mower deck.

With the present invention, the front and back holding portions and the disengaging operation tool are provided on the passage portion. This allows the front and back holding portions and the disengaging operation tool to be attached to and detached from the mower deck together with the passage portion, with the result of good operability.

DESCRIPTION OF EMBODIMENTS

FIGS. 1 to 8 each illustrate a mid-mount mower. In FIGS. 1 to 8, "F" indicates the forward direction, "B" indicates the backward direction, "U" indicates the upward direction, "D" indicates the downward direction, "R" indicates the rightward direction, and "L" indicates the leftward direction.

(Overall Configuration of Mower)

Figure 1:
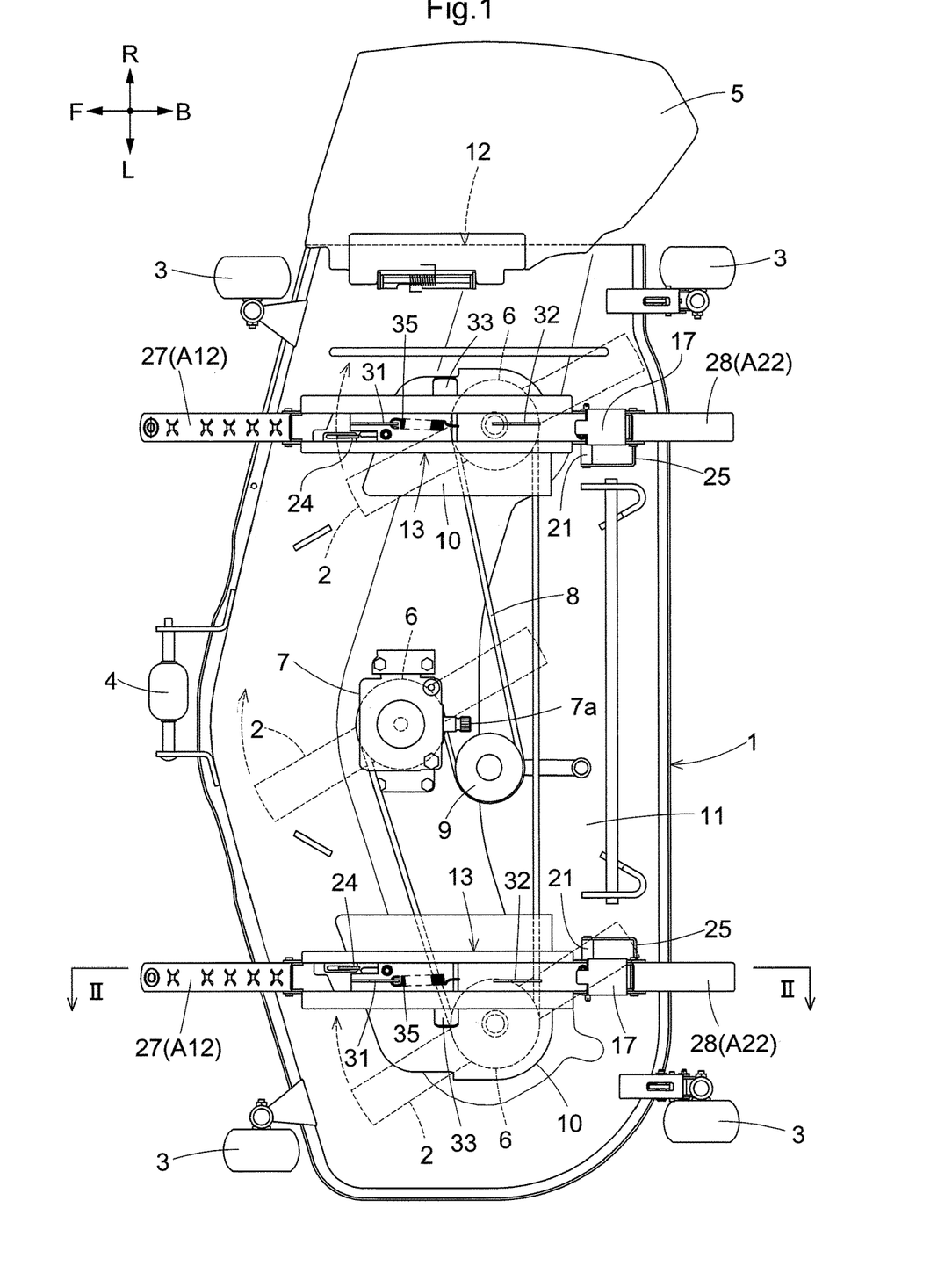
FIG. 1 is a plan view of a mower.

As illustrated in FIG. 1, the mower is configured such that members such as cutting blades 2, ground wheels 3, a roller 4, and a discharge guide 5 are attached to a mower deck 1.

The three cutting blades 2 are each supported by a lower surface portion of the mower deck 1 in such a manner as to be rotatable about a vertical axis. A cutting-blade shaft (not shown in the drawings) connected with each cutting blade 2 protrudes above from an upper surface portion 11 of the mower deck 1. To an upper portion of each cutting-blade shaft, a driving pulley 6 is attached.

Above the central driving pulley 6, an input case 7 is provided. Covers 10 covering the right and left driving pulleys 6 are provided at the upper surface portion 11 of the mower deck 1. Around the three driving pulleys 6, a driving belt 8 is attached. For the driving belt 8, a tension pulley 9 is provided.

In a state where the mower is attached to a work vehicle such as a tractor, power of the work vehicle is transmitted via a transmission shaft (not shown in the drawings) to an input shaft 7a of the input case 7, and the power transmitted to the input case 7 drives the central cutting blade 2 to rotate clockwise in FIG. 1. The power transmitted to the input case 7 is transmitted from the central driving pulley 6 via the driving belt 8 to the right and left driving pulleys 6, driving the right and left cutting blades 2 to rotate clockwise in FIG. 1.

Grass cut with the cutting blades 2 is carried from a front portion of the inside of the mower deck 1 to the right side, and is discharged from a discharge port 12 at a right portion of the mower deck 1 to the right side while being guided by the discharge guide 5.

The four ground wheels 3 are supported at a front portion and back portion of the right portion of the mower deck 1 and at a front portion and back portion of a left portion of the mower deck 1. With the ground wheels 3 grounded, the mower is supported by the ground.

The roller 4 is supported at a central portion of a front portion of the mower deck 1 which central portion is at the center in the left-right direction. In the case where the ground has a bump in a state where a work vehicle to which the mower is attached travels forwardly for the mower to carry out a cutting operation, the roller 4 rides over the bump of the ground and lifts the mower deck 1 to prevent the cutting blades 2 from coming into contact with the bump of the ground.

(Configuration of Passage Portions)

Figure 2:
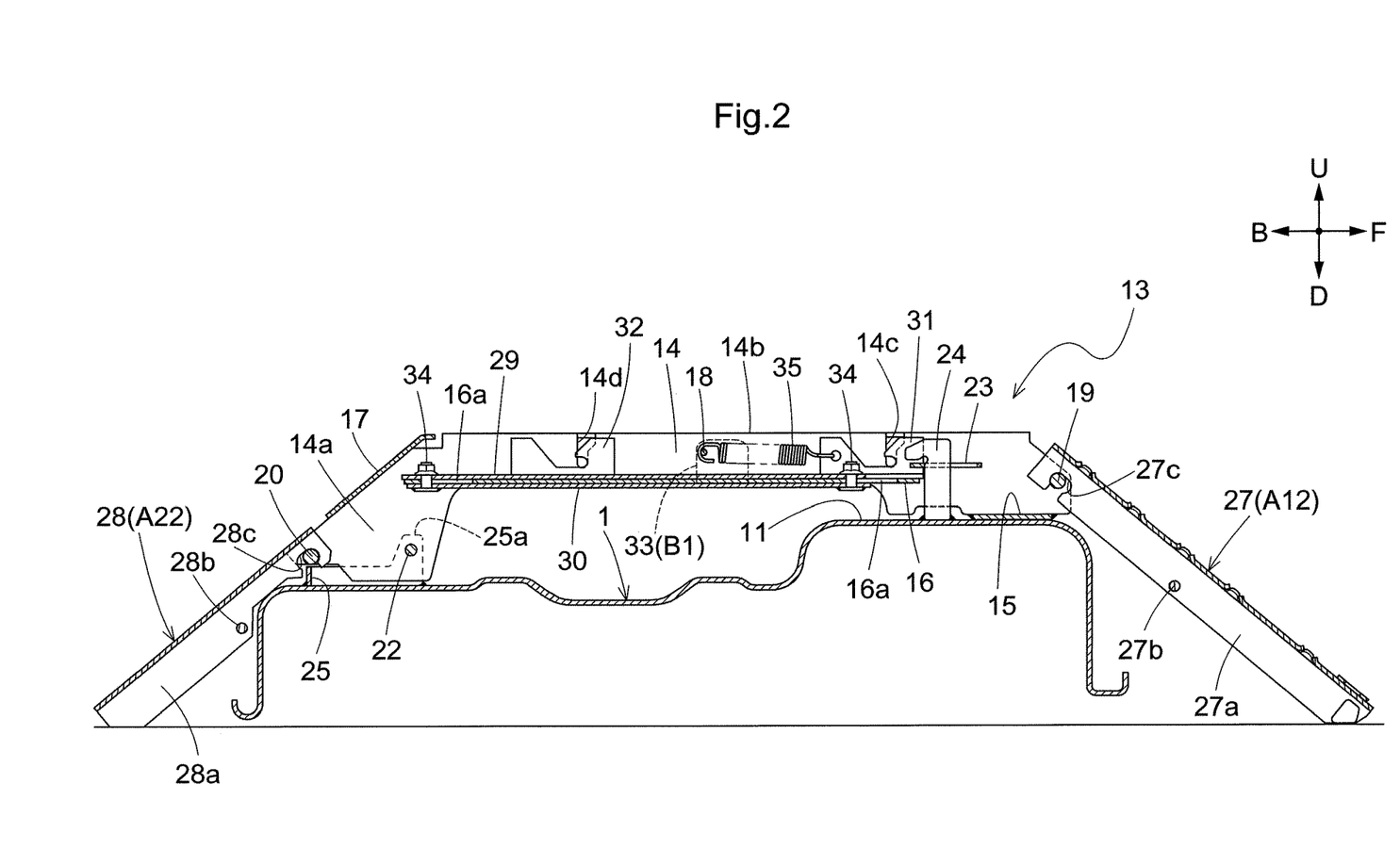
FIG. 2 is a cross-sectional view taken along line II-II in FIG. 1.

As illustrated in FIGS. 1 and 2, right and left passage portions 13 are provided at a right portion and left portion of the upper surface portion 11 of the mower deck 1 in the front-back direction astride the driving pulleys 6 and the covers 10. The right and left passage portions 13 are identical to each other in configuration, and are shaped in left-right symmetry with each other. The description below deals with the left passage portion 13.

As illustrated in FIGS. 1 to 4, right and left side plates 14 are provided in the passage portion 13 in the front-back direction. At a lower end portion of a front portion of the passage portion 13, a bottom plate 15 is connected across the right and left side plates 14. At a lower end portion of an intermediate portion of the passage portion 13, a bottom plate 16 is connected across the right and left side plates 14.

Extending portions 14a extend downwardly from back portions of the right and left side plates 14. A top plate 17 is connected across upper end portions of the extending portions 14a of the right and left side plates 14. Upper side portions 14b of the right and left side plates 14 are bent outwardly to the right and left.

At each of a front portion and back portion of the bottom plate 16, an elongate hole portion 16a is open in the front-back direction along the passage portion 13 (side plates 14). At a front portion of the left side plate 14, a front guiding portion 14c is open. At a back portion of the left side plate 14, a back guiding portion 14d is open.

A fulcrum shaft 18 is connected across intermediate portions of the right and left side plates 14 in the front-back direction. A fulcrum shaft 19 is connected across front portions of the right and left side plates 14. A fulcrum shaft 20 is connected across the extending portions 14a of the right and left side plates 14.

As described above, the passage portion 13 is in the shape of an upwardly open channel with the right and left side plates 14 and the bottom plates 15 and 16.

(Arrangement for Attachment and Detachment of Passage Portions to and from Mower Deck)

As illustrated in FIGS. 1 to 4, for the right passage portion 13, a boss portion 21 is connected with an outer surface portion of the extending portion 14a of the left side plate 14, and for the left passage portion 13, a boss portion 21 is connected with an outer surface portion of the extending portion 14a of the right side plate 14.

An attaching pin 22 (corresponding to the "attaching portion") is provided in such a manner as to be capable of becoming inserted through and pulled out of the extending portion 14a and the boss portion 21 of each of the right and left side plates 14. An attaching plate 23 (corresponding to the "attaching portion") having an elongate hole that is open in the front-back direction is connected with an inner surface portion of a front portion of the right (left) side plate 14.

With each of a right portion and left portion of a front portion at the upper surface portion 11 of the mower deck 1, a hook-shaped engaging portion 24 (corresponding to the "attaching portion") is connected. With each of a right portion and left portion of a back portion at the upper surface portion 11 of the mower deck 1, a connecting portion 25 (corresponding to the "attaching portion") in the shape of a channel in a plan view is connected. The connecting portion 25 includes right and left protruding portions 25a.

In the case where the passage portions 13 are to be attached to the mower deck 1, first, while the bottom plates 15 of the passage portions 13 are placed on a front portion of the upper surface portion 11 of the mower deck 1, each engaging portion 24 is placed between the right and left side plates 14 of the corresponding passage portion 13 and inserted into the elongate hole of the attaching plate 23 of the passage portion 13 so that the engaging portion 24 is caused to engage with the attaching plate 23 of the passage portion 13.

Along with the above-described operation, while the extending portions 14a of the right and left side plates 14 of each passage portion 13 are inserted into the corresponding connecting portion 25, the extending portions 14a are placed at a back portion of the upper surface portion 11 of the mower deck 1. As a result of this, the boss portion 21 of the passage portion 13 is positioned at the protruding portions 25a of the connecting portion 25. Thus, the attaching pin 22 is inserted through the right and left protruding portions 25a of the connecting portion 25, the extending portions 14a of the right and left side plates 14 of the passage portion 13, and the boss portion 21. A retaining pin 26 is attached to the attaching pin 22.

As described above, the engagement between the engaging portion 24 and the attaching plate 23, and the attaching pin 22 cause the passage portion 13 to be attached to the mower deck 1. Removing the retaining pin 26 from the attaching pin 22, pulling the attaching pin 22 out of the passage portion 13, and detaching the attaching plate 23 from the engaging portion 24 allow the passage portion 13 to be detached from the mower deck 1.

(Configuration of Front and Back Slope Portions)

As illustrated in FIGS. 1 to 4, a front slope portion 27 is provided at a front portion of each of the right and left passage portions 13, and a back slope portion 28 is provided at a back portion of each of the right and left passage portions 13.

The right and left front slope portions 27 are identical to each other in configuration, and are shaped in left-right symmetry with each other. The right and left back slope portions 28 are identical to each other in configuration, and are shaped in left-right symmetry with each other. The description below deals with the left front slope portion 27 and the left back slope portion 28.

The front slope portion 27 is a plate member bent in the shape of a channel. At a front portion of the front slope portion 27, a pin 27b (corresponding to the "engagement portion") is connected across right and left vertical surface portions 27a of the front slope portion 27. The pin 27b protrudes from the left vertical surface portion 27a. At a back portion of each of the right and left vertical surface portions 27a, an attaching portion 27c in the shape of a cutout is provided.

The back slope portion 28 is a plate member bent in the shape of a channel. At a back portion of the back slope portion 28, a pin 28b (corresponding to the "engagement portion") is connected across right and left vertical surface portions 28a of the back slope portion 28. The pin 28b protrudes from the left vertical surface portion 28a. At a front portion of each of the right and left vertical surface portions 28a, an attaching portion 28c in the shape of a cutout is provided.

(Configurations of Front and Back Holding Portions, Operating Members, and Disengaging Operation Tool)

Figure 3:
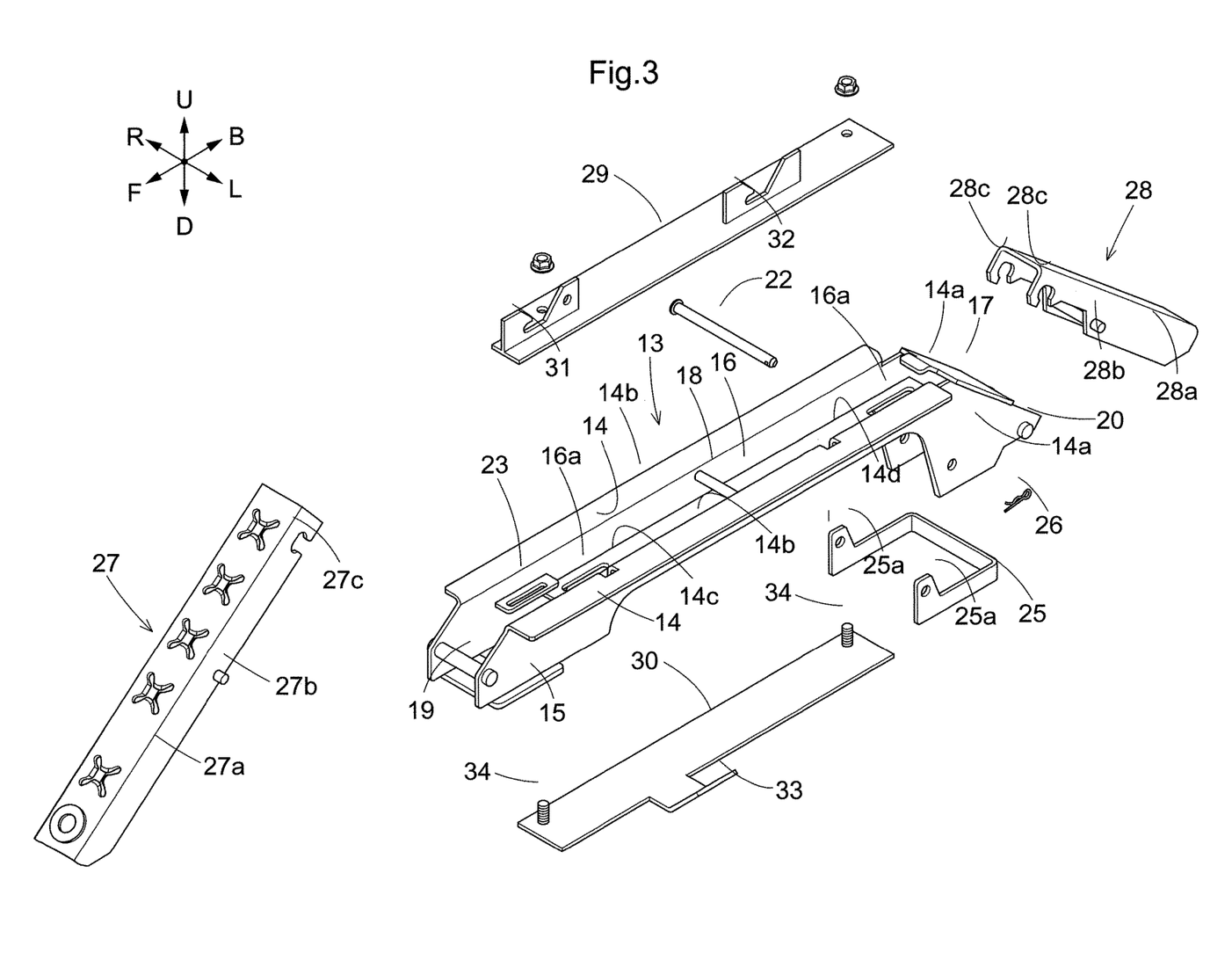
FIG. 3 is an exploded perspective view of members such as a passage portion, front and back slope portions, and upper and lower operating members.
Figure 4:
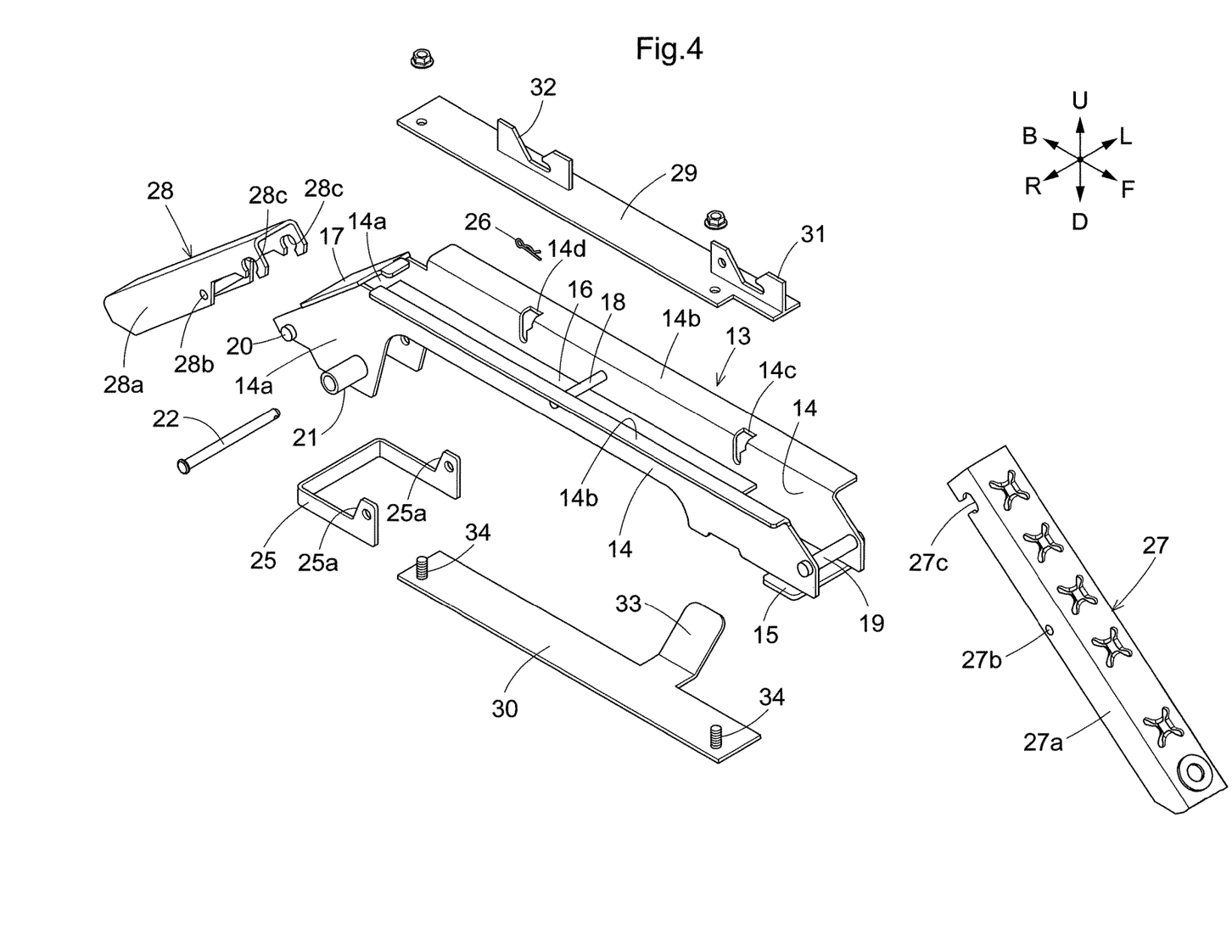
FIG. 4 is an exploded perspective view of members such as a passage portion, front and back slope portions, and upper and lower operating members.

As illustrated in FIGS. 3 and 4, an upper operating member 29 in the shape of a flat plate and a lower operating member 30 in the shape of a flat plate are provided.

A hook-shaped front holding portion 31 is provided at a front portion of the upper operating member 29 in such a manner as to face backwardly. A hook-shaped back holding portion 32 is provided at a back portion of the upper operating member 29 in such a manner as to face backwardly identically to the front holding portion 31. A disengaging operation tool 33 in the shape of a flat plate is provided at a left portion of the lower operating member 30, and extends from the lower operating member 30 to the left side.

As illustrated in FIGS. 2 to 5, each passage portion 13 is configured such that the upper operating member 29 is present on an upper surface of the bottom plate 16 in such a manner as to be positioned between the right and left side plates 14 in a plan view and that the front and back holding portions 31 and 32 are placed between the right and left side plates 14 in a plan view.

The lower operating member 30 is in contact with a lower surface of the bottom plate 16. Bolts 34 extend through the elongate hole portions 16a of the bottom plate 16, and are connected across the upper operating member 29 and the lower operating member 30. The disengaging operation tool 33 protrudes from below the left side plate 14 to the left side.

The upper and lower operating members 29 and 30 are supported by the passage portion 13 between the right and left side plates 14 in such a manner as to be movable in the front-back direction along the passage portion 13 (side plates 14) within the range of the elongate hole portions 16a of the bottom plate 16.

A spring 35 is connected across the fulcrum shaft 18 and the front holding portion 31. The spring 35 urges the upper and lower operating members 29 and 30, the back holding portion 32, and the disengaging operation tool 33 backwardly via the front holding portion 31.

Figure 5:
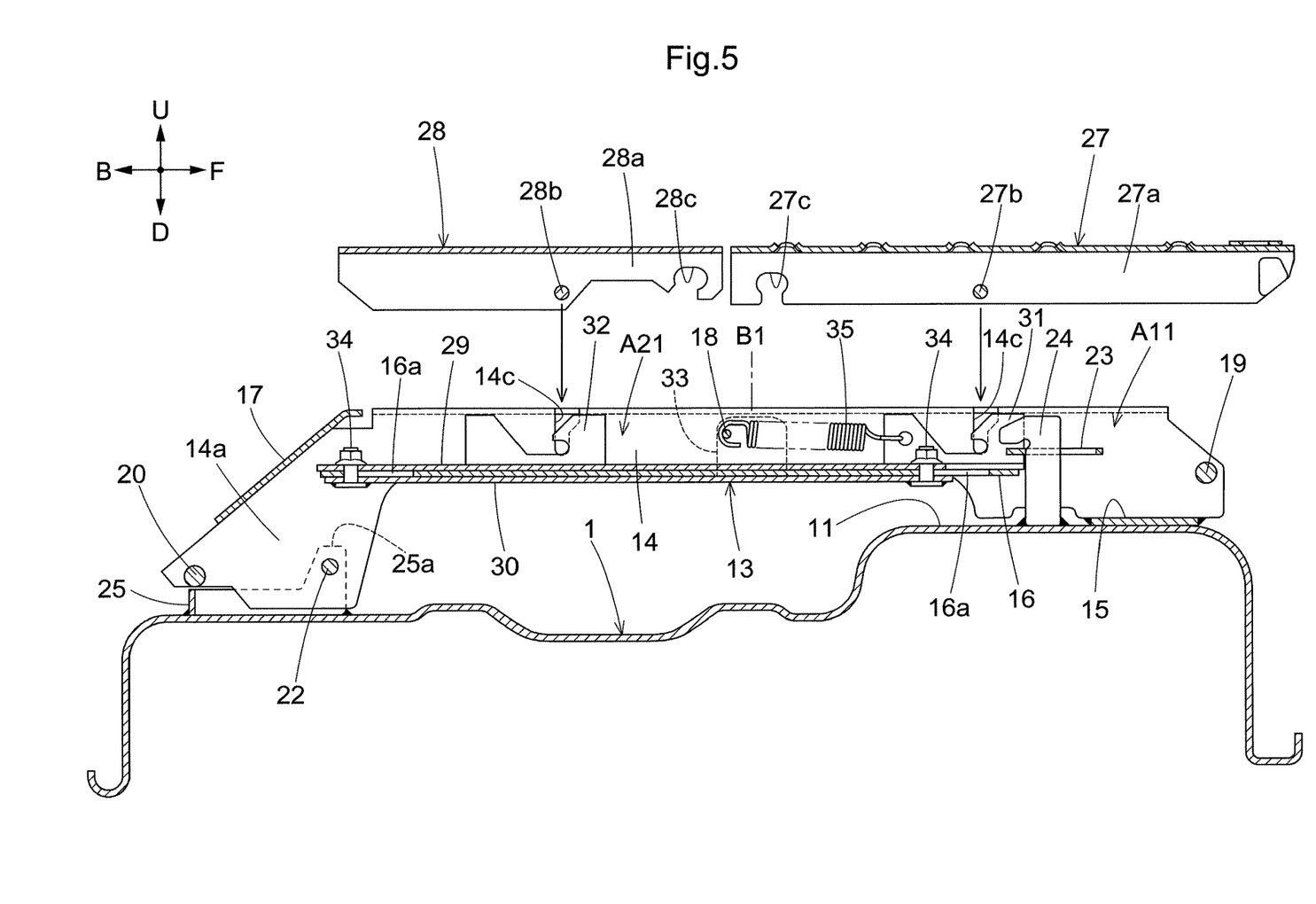
FIG. 5 is a cross-sectional view taken along line II-II in FIG. 1 in a state where front and back slope portions have been detached from front and back storage positions.

FIGS. 2 and 5 illustrate a state where the bolts 34 are in contact with back end portions of the elongate hole portions 16a of the bottom plate 16, and the upper and lower operating members 29 and 30 and the disengaging operation tool 33 are at rest at a holding position B1. In this state, the front holding portion 31 is adjacent laterally to the front guiding portion 14c of the left side plate 14, and the back holding portion 32 is adjacent laterally to the back guiding portion 14d of the left side plate 14.

With the above configuration, as illustrated in FIGS. 2 to 5, the front and back holding portions 31 and 32 and the disengaging operation tool 33 are provided for the same operating members 29 and 30. The upper and lower operating members 29 and 30, the front and back holding portions 31 and 32, the disengaging operation tool 33, and the spring 35 are provided for the passage portion 13.

The upper and lower operating members 29 and 30 are supported by the passage portion 13 in such a manner as to be movable in an engaging direction (backward direction) and a disengaging direction (forward direction), and are urged by the spring 35 in the engaging direction (backward direction). The engaging direction, which is one of the engaging direction and the disengaging direction, is a backward direction along the passage portion 13, whereas the disengaging direction, which is one of the engaging direction and the disengaging direction, is a forward direction along the passage portion 13.

(Attachment of Front Slope Portion to Front Storage Position)

FIG. 5 illustrates a state where the front and back slope portions 27 and 28 have been detached from the passage portion 13. A front portion between the right and left side plates 14 is the front storage position A11, whereas a back portion between the right and left side plates 14 is the back storage position A21.

Figure 6:
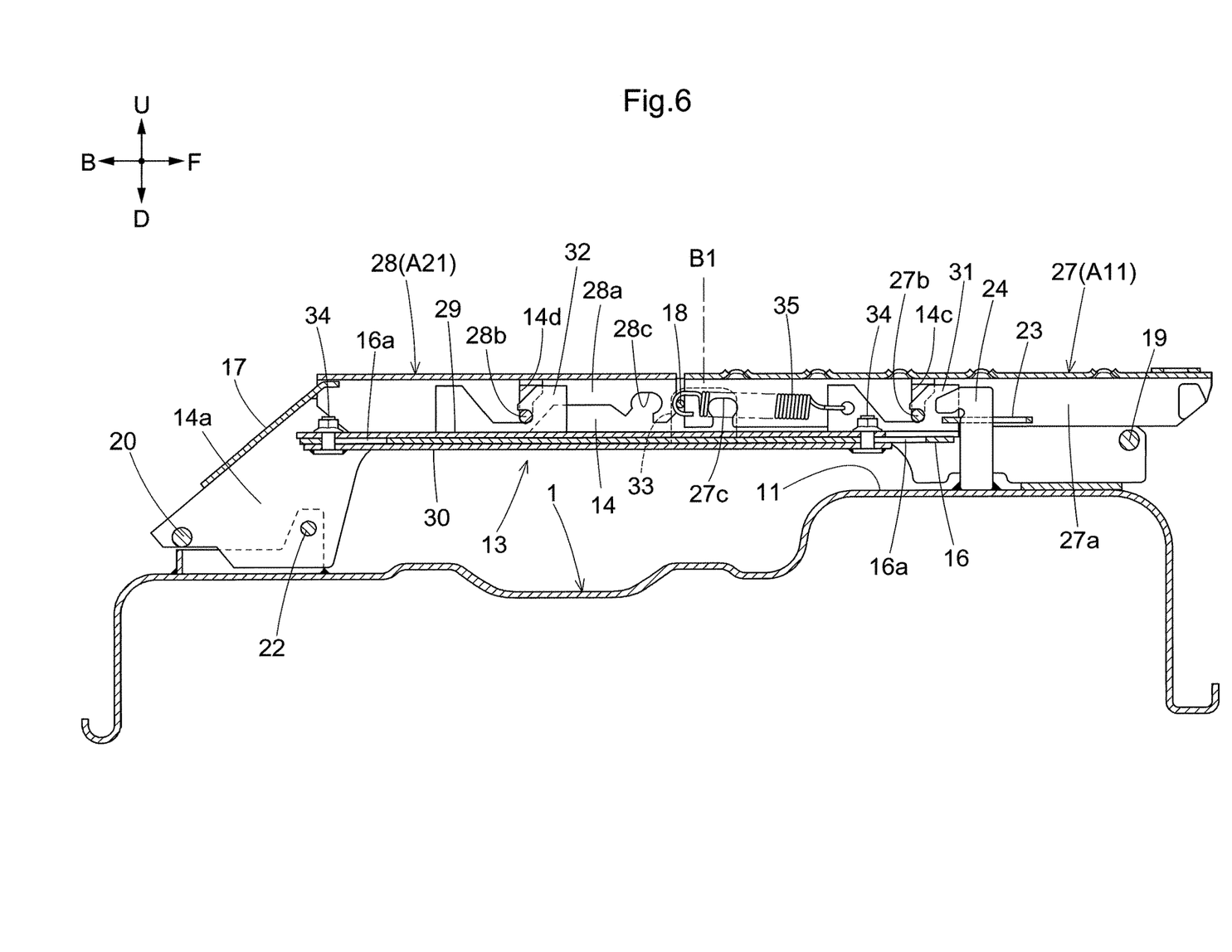
FIG. 6 is a cross-sectional view taken along line II-II in FIG. 1 in a state where front and back slope portions have been attached to front and back storage positions.
Figure 7:
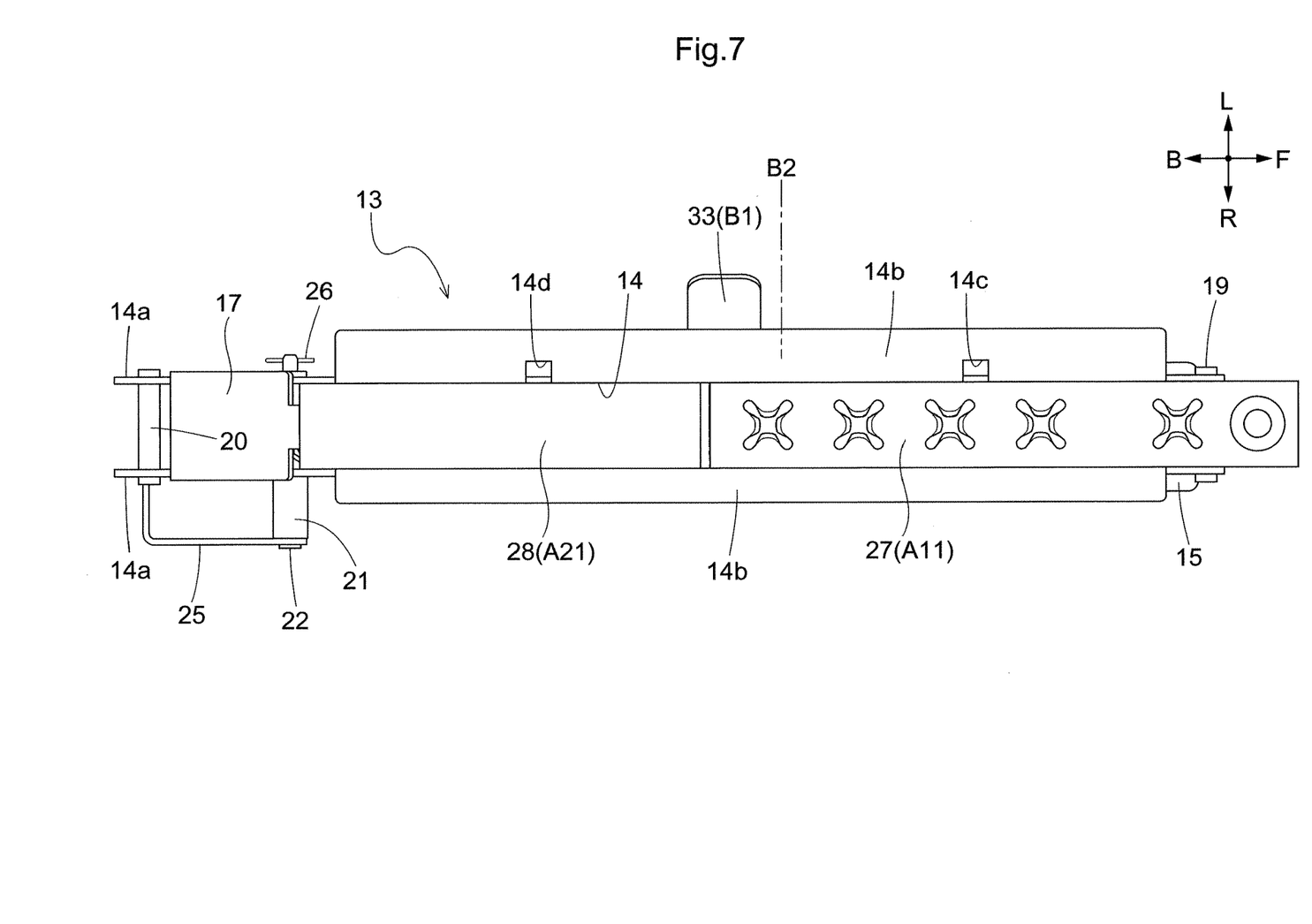
FIG. 7 is a plan view of members such as a passage portion and front and back slope portions in a state where the front and back slope portions have been attached to front and back storage positions.

From the state illustrated in FIG. 5, as illustrated in FIGS. 6 and 7, an operator places the front slope portion 27 at the front storage position A11 between the right and left side plates 14 from above the right and left side plates 14 with the front slope portion 27 facing forwardly. The operator pushes the front slope portion 27 into the front storage position A11 between the right and left side plates 14 while placing a protruding portion of the pin 27b of the front slope portion 27 in the front guiding portion 14c of the left side plate 14.

The protruding portion of the pin 27b of the front slope portion 27 is guided downwardly by the front guiding portion 14c of the left side plate 14. The pin 27b of the front slope portion 27 is guided to the front holding portion 31 at the holding position B1, and pushes the front holding portion 31 (the back holding portion 32, the upper and lower operating members 29 and 30, the disengaging operation tool 33) a little in the forward direction toward a disengaging position B2 (see FIG. 8) against the spring 35 while being in contact with the front holding portion 31.

When the protruding portion of the pin 27b of the front slope portion 27 reaches a lower end portion of the front guiding portion 14c of the left side plate 14, the pin 27b of the front slope portion 27 moves to a lower portion of the front holding portion 31. The spring 35 causes the front holding portion 31 (the back holding portion 32, the upper and lower operating members 29 and 30, the disengaging operation tool 33) to move to the holding position B1, and the front holding portion 31 automatically engages with the pin 27b of the front slope portion 27.

As described above, along with the attachment of the front slope portion 27 to the front storage position A11, the front holding portion 31 automatically engages with the pin 27b of the front slope portion 27, and the front slope portion 27 becomes held at the front storage position A11.

In this case, even if the operator tries to attach the front slope portion 27 to the front storage position A11 with the front slope portion 27 facing backwardly, the protruding portion of the pin 27b of the front slope portion 27 comes into contact with the upper side portion 14b of the right side plate 14, so that the operator is prevented from attaching the front slope portion 27 to the front storage position A11.

(Attachment of Back Slope Portion to Back Storage Position)

From the state illustrated in FIG. 5, as illustrated in FIGS. 6 and 7, an operator places the back slope portion 28 at the back storage position A21 between the right and left side plates 14 from above the right and left side plates 14 with the back slope portion 28 facing backwardly. The operator pushes the back slope portion 28 into the back storage position A21 between the right and left side plates 14 while placing a protruding portion of the pin 28b of the back slope portion 28 in the back guiding portion 14d of the left side plate 14.

The protruding portion of the pin 28b of the back slope portion 28 is guided downwardly by the back guiding portion 14d of the left side plate 14. The pin 28b of the back slope portion 28 is guided to the back holding portion 32 at the holding position B1, and pushes the back holding portion 32 (the front holding portion 31, the upper and lower operating members 29 and 30, the disengaging operation tool 33) a little in the forward direction toward the disengaging position B2 (see FIG. 8) against the spring 35 while being in contact with the back holding portion 32.

When the protruding portion of the pin 28b of the back slope portion 28 reaches a lower end portion of the back guiding portion 14d of the left side plate 14, the pin 28b of the back slope portion 28 passes through the back holding portion 32 downwardly. The spring 35 causes the back holding portion 32 (the front holding portion 31, the upper and lower operating members 29 and 30, the disengaging operation tool 33) to move to the holding position B1, and the back holding portion 32 automatically engages with the pin 28b of the back slope portion 28.

As described above, along with the attachment of the back slope portion 28 to the back storage position A21, the back holding portion 32 automatically engages with the pin 28b of the back slope portion 28, and the back slope portion 28 becomes held at the back storage position A21.

In this case, even if the operator tries to attach the back slope portion 28 to the back storage position A21 with the back slope portion 28 facing forwardly, the protruding portion of the pin 28b of the back slope portion 28 comes into contact with the upper side portion 14b of the right side plate 14, so that the operator is prevented from attaching the back slope portion 28 to the back storage position A21.

With the above configuration, as illustrated in FIGS. 5 and 6, an engaging direction in which the front holding portion 31 is moved to engage with the pin 27b of the front slope portion 27 and an engaging direction in which the back holding portion 32 is moved to engage with the pin 28b of the back slope portion 28 are the same direction (backward direction), which is a direction opposite to a disengaging direction (forward direction) described later.

As illustrated in FIGS. 6 and 7, the front and back holding portions 31 and 32 are positioned between the right and left side plates 14 in a plan view and are positioned below the front and back slope portions 27 and 28 as attached to the front and back storage positions A11 and A21.

(Detachment of Front and Back Slope Portions from Front and Back Storage Positions)

FIGS. 6 and 7 illustrate a state where the front and back slope portions 27 and 28 are attached to and held at the front and back storage positions A11 and A21.

Figure 8:
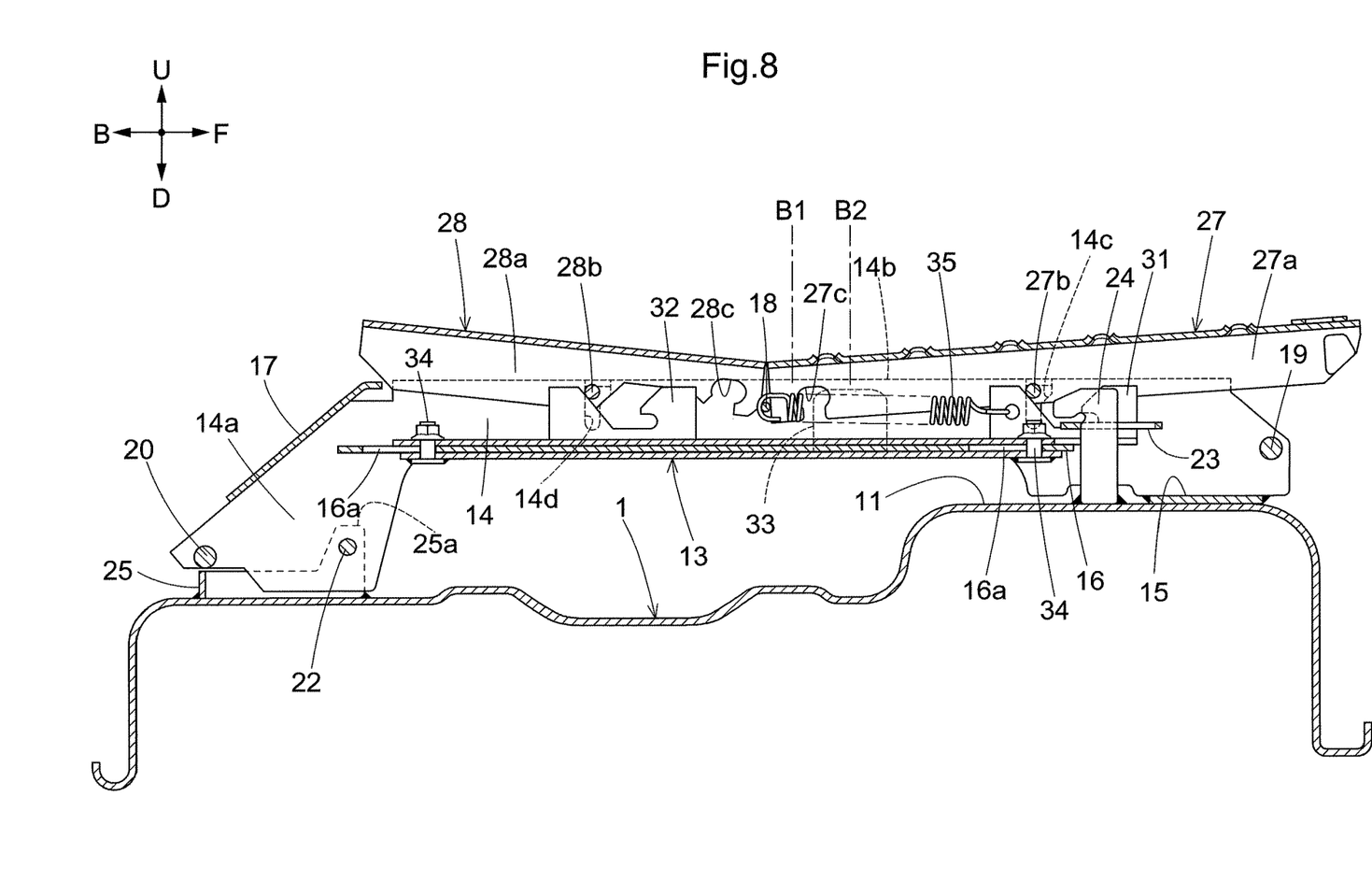
FIG. 8 is a cross-sectional view taken along line II-II in FIG. 1 in a state where a disengaging operation tool has been operated from the state illustrated in FIG. 6 to a disengaging position.

From the state illustrated in FIGS. 6 and 7, as illustrated in FIG. 8, the operator can operate the upper and lower operating members 29 and 30 to the disengaging position B2 by operating the disengaging operation tool 33 from the holding position B1 to the disengaging position B2 against the spring 35. The operator can release the front holding portion 31 and the back holding portion 32 from the pins 27b and 28b of the front and back slope portions 27 and 28 and operate the front holding portion 31 and the back holding portion 32.

In this case, back portions of the front and back holding portions 31 and 32 come into contact with the pins 27b and 28b of the front and back slope portions 27 and 28 and push up the pins 27b and 28b of the front and back slope portions 27 and 28. The front and back slope portions 27 and 28 are raised a little from between the right and left side plates 14 (front and back storage positions A11 and A21).

This allows the operator to detach the front and back slope portions 27 and 28 from the front and back storage positions A11 and A21 as illustrated in FIG. 5 while holding the disengaging operation tool 33 at the disengaging position B2. Since the front and back slope portions 27 and 28 are raised a little from between the right and left side plates 14, the operator can easily hold the front and back slope portions 27 and 28.

With the above configuration, a disengaging direction in which the front holding portion 31 is moved to become released from the pin 27b of the front slope portion 27 and a disengaging direction in which the back holding portion 32 is moved to become released from the pin 28b of the back slope portion 28 are the same direction (forward direction), which is a direction opposite to the engaging direction (backward direction) described above.

(Attachment of Front and Back Slope Portions to Front and Back Use Positions)

After detaching the front and back slope portions 27 and 28 from the front and back storage positions A11 and A21 as described under "(Detachment of front and back slope portions from front and back storage positions)" above and illustrated in FIG. 5, the operator, as illustrated in FIGS. 1 and 2, attaches the attaching portion 27c of the front slope portion 27 to the fulcrum shaft 19 and places a front portion of the front slope portion 27 on the ground, and attaches the attaching portion 28c of the back slope portion 28 to the fulcrum shaft 20 and places a back portion of the back slope portion 28 on the ground.

As a result of this, the front slope portion 27 is in a state where the front slope portion 27 is attached to a front use position A12, at which the front slope portion 27 extends from a front portion of the passage portion 13 obliquely in a lower front direction, and a front portion of the front slope portion 27 is capable of coming into contact with the ground.

At the front use position A12, the front slope portion 27 is supported by the ground via a front portion of the front slope portion 27, and is supported by the upper surface portion 11 of the mower deck 1 via the fulcrum shaft 19 and the passage portion 13.

The back slope portion 28 is in a state where the back slope portion 28 is attached to a back use position A22, at which the back slope portion 28 extends from a back portion of the passage portion 13 obliquely in a lower back direction, and a back portion of the back slope portion 28 is capable of coming into contact with the ground.

At the back use position A22, the back slope portion 28 is supported by the ground via a back portion of the back slope portion 28, and is supported by the upper surface portion 11 of the mower deck 1 via the fulcrum shaft 20 and the passage portion 13.

(First Other Embodiment of Invention)

The upper and lower operating members 29 and 30 may be supported by the passage portion 13 in such a manner as to be movable in the engaging direction (forward direction) and the disengaging direction (backward direction), and urged by the spring 35 in the engaging direction (forward direction).

With this configuration, an engaging direction in which the front holding portion 31 is moved to engage with the pin 27b of the front slope portion 27 and an engaging direction in which the back holding portion 32 is moved to engage with the pin 28b of the back slope portion 28 are the same direction (forward direction).

A disengaging direction in which the front holding portion 31 is moved to become released from the pin 27b of the front slope portion 27 and a disengaging direction in which the back holding portion 32 is moved to become released from the pin 28b of the back slope portion 28 are the same direction (backward direction).

The engaging direction (forward direction) and the disengaging direction (backward direction) are directions opposite to each other.

(Second Other Embodiment of Invention)

The spring 35 may be absent.

With this configuration, even if an operator operates the disengaging operation tool 33 to the disengaging position B2 and stops holding the disengaging operation tool 33, the disengaging operation tool 33 (the front and back holding portions 31 and 32, the upper and lower operating members 29 and 30) remains at the disengaging position B2.

After attaching the front and back slope portions 27 and 28 to the front and back storage positions A11 and A21, the operator operates the disengaging operation tool 33 from the disengaging position B2 to the holding position B1 to hold the front and back slope portions 27 and 28 at the front and back storage positions A11 and A21.

(Third Other Embodiment of Invention)

The passage portion 13 may be configured such that the front guiding portion 14c is open at a front portion of the right side plate 14, and that the back guiding portion 14d is open at a back portion of the right side plate 14.

With this configuration, the pin 27b protrudes from the right vertical surface portion 27a at the front slope portion 27, and the pin 28b protrudes from the right vertical surface portion 28a at the back slope portion 28.

The passage portion 13 may be configured such that the front guiding portion 14c is open at a front portion of the right side plate 14, and that the back guiding portion 14d is open at a back portion of the left side plate 14.

With this configuration, the pin 27b protrudes from the right vertical surface portion 27a at the front slope portion 27, and the pin 28b protrudes from the left vertical surface portion 28a at the back slope portion 28.

The passage portion 13 may be configured such that the front guiding portion 14c is open at a front portion of the left side plate 14, and that the back guiding portion 14d is open at a back portion of the right side plate 14.

With this configuration, the pin 27b protrudes from the left vertical surface portion 27a at the front slope portion 27, and the pin 28b protrudes from the right vertical surface portion 28a at the back slope portion 28.

INDUSTRIAL APPLICABILITY

The present invention is applicable not only to a mower including three cutting blades 2 but also to a mower including two cutting blades 2 and a mower including four cutting blades 2.

REFERENCE SIGNS LIST

1 Mower deck
13 Passage portion
14 Side plate
14c Front guiding portion
14d Back guiding portion
22 Attaching pin (attaching portion)
23 Attaching plate (attaching portion)
24 Engaging portion (attaching portion)
25 Connecting portion (attaching portion)
27 Front slope portion
27b Pin (engagement portion)
28 Back slope portion
28b Pin (engagement portion)
29 Upper operating member (operating member)
30 Lower operating member (operating member)
31 Front holding portion
32 Back holding portion
33 Disengaging operation tool
35 Spring (urging member)
A11 Front storage position
A12 Front use position
A21 Back storage position
A22 Back use position
B2 Disengaging position

The invention claimed is:

1. A mower, comprising:
a passage portion provided at each of a right portion and a left portion of an upper surface portion of a mower deck and oriented in a front-back direction, on which passage portion a wheel of a work vehicle passes;
a front slope portion attachable to and detachable from a front storage position provided at the passage portion and a front use position at which the front slope portion extends from a front portion of the passage portion obliquely in a lower front direction such that a front portion of the front slope portion is in contact with ground;
a back slope portion attachable to and detachable from a back storage position provided at the passage portion and a back use position at which the back slope portion extends from a back portion of the passage portion obliquely in a lower back direction such that a back portion of the back slope portion is in contact with the ground;
a front holding portion configured to engage with an engagement portion of the front slope portion as attached to the front storage position and hold the front slope portion at the front storage position;
a back holding portion configured to engage with an engagement portion of the back slope portion as attached to the back storage position and hold the back slope portion at the back storage position; and
a disengaging operation tool configured to be manually operated to a disengaging position at which the front holding portion is releasable from the engagement portion of the front slope portion such that the front slope portion is detachable from the front storage position and at which the back holding portion is releasable from the engagement portion of the back slope portion such that the back slope portion is detachable from the back storage position,
wherein:
an engaging direction in which the front holding portion engages with the engagement portion of the front slope portion and an engaging direction in which the back holding portion engages the engagement portion of the back slope portion are along the passage portion, and
a disengaging direction in which the front holding portion disengages from the engagement portion of the front slope portion and a disengaging direction in which the back holding portion disengages from the engagement portion of the back slope portion are along the passage portion.

2. The mower according to claim 1, wherein:
the engaging direction of the front holding portion is identical to the engaging direction of the back holding portion, and
the disengaging direction of the front holding portion is identical to the disengaging direction of the back holding portion, the disengaging direction being opposite to the engaging direction.

3. The mower according to claim 2, wherein:
the front holding portion, the back holding portion, and the disengaging operation tool are provided on a single operating member, and
the operating member is supported in such a manner as to be movable in the engaging direction and the disengaging direction.

4. The mower according to claim 3, wherein:
a first one of the engaging direction and the disengaging direction is a forward direction along the passage portion, and
a second one of the engaging direction and the disengaging direction is a backward direction along the passage portion.

5. The mower according to claim 3, further comprising:
an urging member urging the operating member in the engaging direction,
wherein when the front slope portion is to be attached to the front storage position, the front holding portion engages automatically with the engagement portion of the front slope portion, and
when the back slope portion is to be attached to the back storage position, the back holding portion engages automatically with the engagement portion of the back slope portion.

6. The mower according to claim 1, wherein:
the passage portion includes a right side plate and a left side plate that are oriented in the front-back direction,
a space between the right side plate and the left side plate is open in an upward direction,
the front storage position and the back storage position are provided between the right side plate and the left side plate in a plan view, and
the front slope portion and the back slope portion are placed between the right side plate and the left side plate from above the right side plate and the left side plate so that the front slope portion and the back slope portion become attached to the front storage position and the back storage position, respectively.

7. The mower according to claim 6, wherein:
the front holding portion and the back holding portion are positioned between the right side plate and the left side plate in the plan view and below the front slope portion and the back slope portion as attached to the front storage position and the back storage position, respectively.

8. The mower according to claim 7, further comprising:
a front guiding portion configured to guide the engagement portion of the front slope portion to the front holding portion when the front slope portion is to be attached to the front storage position; and
a back guiding portion configured to guide the engagement portion of the back slope portion to the back holding portion when the back slope portion is to be attached to the back storage position.

9. The mower according to claim 8, wherein:
the front guiding portion is provided on one of the right side plate and the left side plate, and
the back guiding portion is provided on either of the right side plate and the left side plate.

10. The mower according to claim 1, wherein:
the front holding portion, the back holding portion, and the disengaging operation tool are provided on the passage portion, and
the mower further comprises an attaching portion configured to attach the passage portion to and detach the passage portion from the mower deck.

11. A mower, comprising:
a passage portion provided at each of a right portion and a left portion of an upper surface portion of a mower deck and oriented in a front-back direction, on which passage portion a wheel of a work vehicle passes;
a front slope portion attachable to and detachable from a front storage position provided at the passage portion and a front use position at which the front slope portion extends from a front portion of the passage portion obliquely in a lower front direction such that a front portion of the front slope portion is in contact with ground;
a back slope portion attachable to and detachable from a back storage position provided at the passage portion and a back use position at which the back slope portion extends from a back portion of the passage portion obliquely in a lower back direction such that a back portion of the back slope portion is in contact with the ground;
a front holding portion configured to engage with an engagement portion of the front slope portion as attached to the front storage position and hold the front slope portion at the front storage position;
a back holding portion configured to engage with an engagement portion of the back slope portion as attached to the back storage position and hold the back slope portion at the back storage position; and
a disengaging operation tool configured to be manually operated to a disengaging position at which the front holding portion is releasable from the engagement portion of the front slope portion such that the front slope portion is detachable from the front storage position and at which the back holding portion is releasable from the engagement portion of the back slope portion such that the back slope portion is detachable from the back storage position,
wherein:
the front holding portion engages with the engagement portion of the front slope portion in an engaging direction identical to a direction in which the back holding portion engages with the engagement portion of the back slope portion,
the front holding portion disengages from the engagement portion of the front slope portion in a disengaging direction identical to a direction in which the back holding portion disengages from the engagement portion of the back slope portion, the disengaging direction being opposite to the engaging direction,
the front holding portion, the back holding portion, and the disengaging operation tool are provided on a single operating member, and
the operating member is supported in such a manner as to be movable in the engaging direction and the disengaging direction.

12. A mower, comprising:
a passage portion provided at each of a right portion and a left portion of an upper surface portion of a mower deck and oriented in a front-back direction, on which passage portion a wheel of a work vehicle passes;
a front slope portion attachable to and detachable from a front storage position provided at the passage portion and a front use position at which the front slope portion extends from a front portion of the passage portion obliquely in a lower front direction such that a front portion of the front slope portion is in contact with ground;
a back slope portion attachable to and detachable from a back storage position provided at the passage portion and a back use position at which the back slope portion extends from a back portion of the passage portion obliquely in a lower back direction such that a back portion of the back slope portion is in contact with the ground;
a front holding portion configured to engage with an engagement portion of the front slope portion as attached to the front storage position and hold the front slope portion at the front storage position;
a back holding portion configured to engage with an engagement portion of the back slope portion as attached to the back storage position and hold the back slope portion at the back storage position; and a disengaging operation tool configured to be manually operated to a disengaging position at which the front holding portion is releasable from the engagement portion of the front slope portion such that the front slope portion is detachable from the front storage position and at which the back holding portion is releasable from the engagement portion of the back slope portion such that the back slope portion is detachable from the back storage position, wherein:

the passage portion includes a right side plate and a left side plate that are oriented in the front-back direction, a space between the right side plate and the left side plate is open in an upward direction, the front storage position and the back storage position are provided between the right side plate and the left side plate in a plan view, the front slope portion and the back slope portion are placed between the right side plate and the left side plate from above the right side plate and the left side plate so that the front slope portion and the back slope portion become attached to the front storage position and the back storage position, respectively, and the front holding portion and the back holding portion are positioned between the right side plate and the left side plate in the plan view and below the front slope portion and the back slope portion as attached to the front storage position and the back storage position, respectively.

13. A mower, comprising:

a passage portion provided at each of a right portion and a left portion of an upper surface portion of a mower deck and oriented in a front-back direction, on which passage portion a wheel of a work vehicle passes;

a front slope portion attachable to and detachable from a front storage position provided at the passage portion and a front use position at which the front slope portion extends from a front portion of the passage portion obliquely in a lower front direction such that a front portion of the front slope portion is in contact with ground;

a back slope portion attachable to and detachable from a back storage position provided at the passage portion and a back use position at which the back slope portion extends from a back portion of the passage portion obliquely in a lower back direction such that a back portion of the back slope portion is in contact with the ground;

a front holding portion configured to engage with an engagement portion of the front slope portion as attached to the front storage position and hold the front slope portion at the front storage position;

a back holding portion configured to engage with an engagement portion of the back slope portion as attached to the back storage position and hold the back slope portion at the back storage position; and a disengaging operation tool configured to be manually operated to a disengaging position at which the front holding portion is releasable from the engagement portion of the front slope portion such that the front slope portion is detachable from the front storage position and at which the back holding portion is releasable from the engagement portion of the back slope portion such that the back slope portion is detachable from the back storage position, wherein the passage portion includes a right side plate and a left side plate that are oriented in the front-back direction, a space between the right side plate and the left side plate is open in an upward direction, the front storage position and the back storage position are provided between the right side plate and the left side plate in a plan view, the front slope portion and the back slope portion are placed between the right side plate and the left side plate from above the right side plate and the left side plate so that the front slope portion and the back slope portion become attached to the front storage position and the back storage position, respectively, the front holding portion and the back holding portion are positioned between the right side plate and the left side plate in the plan view and below the front slope portion and the back slope portion as attached to the front storage position and the back storage position, respectively, and the mower further comprises:

a front guiding portion configured to guide the engagement portion of the front slope portion to the front holding portion when the front slope portion is to be attached to the front storage position; and a back guiding portion configured to guide the engagement portion of the back slope portion to the back holding portion when the back slope portion is to be attached to the back storage position.

\* \* \* \* \*